United States Patent
Kuranari et al.

(10) Patent No.: US 7,185,112 B1
(45) Date of Patent: Feb. 27, 2007

(54) NETWORK INTERCONNECTION APPARATUS FOR INTERCONNECTING A LAN AND AN ATM NETWORK USING QOS ADJUSTMENT

(75) Inventors: Shinichi Kuranari, Fukuoka (JP); Fumiharu Etoh, Fukuoka (JP); Tomoyuki Furutono, Fukuoka (JP); Hiroki Hamachi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/480,735

(22) Filed: Jan. 10, 2000

(30) Foreign Application Priority Data

Jun. 1, 1999 (JP) ............................. 11-153276

(51) Int. Cl.
*G06F 15/16* (2006.01)
*H04L 12/54* (2006.01)

(52) U.S. Cl. ............... 709/249; 709/232; 370/235; 370/395.1; 370/401

(58) Field of Classification Search ........... 709/249, 709/238, 227–229, 232; 370/235, 395.5, 370/401, 395.1–395.72
See application file for complete search history.

(56) References Cited

U.S. PATENT DOCUMENTS

| | | | | |
|---|---|---|---|---|
| 5,555,265 A * | 9/1996 | Kakuma et al. | ........ | 370/395.43 |
| 5,793,976 A * | 8/1998 | Chen et al. | .................. | 709/224 |
| 5,818,842 A * | 10/1998 | Burwell et al. | ............. | 370/397 |
| 5,946,311 A * | 8/1999 | Alexander et al. | ..... | 370/395.53 |
| 5,970,062 A * | 10/1999 | Bauchot | ................... | 370/310.2 |
| 6,006,275 A * | 12/1999 | Picazo et al. | ................ | 709/249 |
| 6,104,725 A * | 8/2000 | Kavak et al. | ............... | 709/249 |
| 6,175,569 B1 * | 1/2001 | Ellington et al. | ........... | 370/401 |
| 6,226,297 B1 * | 5/2001 | Alexander et al. | ........... | 709/249 |
| 6,330,602 B1 * | 12/2001 | Law et al. | ................... | 709/224 |
| 6,345,055 B1 * | 2/2002 | Frick et al. | ................. | 709/249 |
| 6,459,682 B1 * | 10/2002 | Ellesson et al. | ............ | 370/235 |
| 6,598,034 B1 * | 7/2003 | Kloth | ......................... | 709/224 |
| 6,650,646 B1 * | 11/2003 | Galway et al. | ............. | 370/397 |
| 6,671,276 B1 * | 12/2003 | Bakre et al. | ............. | 370/395.1 |
| 6,678,245 B1 * | 1/2004 | Cooper et al. | .............. | 370/230 |
| 6,789,104 B1 * | 9/2004 | Yamaguchi et al. | ........ | 709/203 |

FOREIGN PATENT DOCUMENTS

| | | |
|---|---|---|
| JP | 09162870 | 6/1997 |
| JP | 09331360 | 12/1997 |

OTHER PUBLICATIONS

The ATM Forum Technical committee: Traffic Management Specification Version 4.0; Apr. 1996.*

* cited by examiner

*Primary Examiner*—David Wiley
*Assistant Examiner*—Joseph E. Avellino
(74) *Attorney, Agent, or Firm*—Katten Muchin Rosenman LLP

(57) ABSTRACT

Network interconnection apparatus and method capable of efficiently guaranteeing optimum QoS suited to the status of actual traffic and network, whereby high-performance network interconnection is achieved without entailing lost calls. Routing information managing means manages routing information of an ATM network, and statistical information managing means manages statistical information on the traffic of a LAN. QoS setting means sets QoS which the ATM network ought to guarantee, based on the statistical information, and QoS guarantee determining means determines based on the routing information whether or not the set QoS can be guaranteed. If it is judged that the QoS cannot be guaranteed, QoS adjusting means adjusts the QoS so that the QoS can be guaranteed. Call connection control means connects call according to the QoS which can be guaranteed.

6 Claims, 15 Drawing Sheets

11a STATISCAL INFORMATION MANAGEMENT TABLE

| TCP/IP CONNECTION IDENTIFIER | FIRST SAMPLING | SECOND SAMPLING | THIRD SAMPLING | FOURTH SAMPLING | FIFTH SAMPLING | AVERAGE TRAFFIC VOLUME |
|---|---|---|---|---|---|---|
| IDENTIFIER #1 | 19.2k | 19.2k | 19.2k | 19.2k | 19.2k | 19.2k |
| IDENTIFIER #2 | 4.8M | 4.8M | 4.8M | 4.8M | 4.8M | 4.8M |
| IDENTIFIER #3 | 240.0k | 144.0k | 5.76M | 5.76M | 96.0k | 2.4M |

(bps)

FIG. 5

| TCP/IP CONNECTION IDENTIFIER | SERVICE CATEGORY | QoS PARAMETER SETTING INFORMATION ||||| 
|---|---|---|---|---|---|---|
| | | PCR | SCR | MBS | CTD | CDV |
| IDENTIFIER #1 | CBR | 50cps | | | ≦20μs | ARBITRARY |
| IDENTIFIER #2 | CBR | 12500cps | | | ≦20μs | ARBITRARY |
| IDENTIFIER #3 | VBR | 15000cps | 6250cps | 30000 CELLS | ARBITRARY | ≦4μs |

F I G. 8

| ROUTE | ROUTING LIST | ACR | CTD | CDV |
|---|---|---|---|---|
| i | A→B→E | 1000 cps | 10 μs | 4 μs |
| ii | A→C→E | 12000 cps | 20 μs | 2 μs |
| iii | A→D→E | 15000 cps | 30 μs | 5 μs |

12a DTL TABLE

FIG. 10

15b INFORMATION ELEMENTS OF CALL CONNECTION REQUEST MESSAGE
(FIRST EMBODIMENT)

| INFORMATION ELEMENT | CONTENTS |
|---|---|
| ATM TRAFFIC DESCRIPTOR | PCR=50 cps |
| BROADBAND BEARER CAPABILITY | SERVICE CATEGORY=CBR |
| DTL | ROUTING LIST=A → B → E |
| CALLED PARTY NUMBER | TERMINATING ATM ADDRESS=ATM ADDRESS OF NODE E |

FIG. 11

15c CALL CONNECTION REQUEST PARAMETERS
(SECOND EMBODIMENT)

| IMFORMATION ELEMENT | CONTENTS |
|---|---|
| ATM TRAFFIC DESCRIPTOR | PCR=50 cps, SCR=6250 cps, MBS=37500 CELLS |
| BROADBAND BEARER CAPABILITY | SERVICE CATEGORY=CBR |
| DTL | ROUTING LIST=A →C → E |
| CALLED PARTY NUMBER | TERMINATING ATM ADDRESS=ATM ADDRESS OF NODE E |

FIG. 12

| | 18a QoS INFORMATION |
|---|---|
| QoS REQUESTED FIRST BUT FAILED TO BE GUARANTEED | SERVICE CATEGORY=VBR<br>PCR=15000 cps<br>SCR=6250 cps<br>MBS=30000 CELLS<br>CTD=ARBITRARY<br>CDV=4μs OR LESS |
| REASON FOR FAILURE TO GUARANTEE | BAND DEFICIENCY OF ROUTE i<br>&<br>BAND DEFICIENCY OF ROUTE ii<br>&<br>CDV OF ROUTE iii |
| OPTIMUM QoS AFTER ADJUSTMENT (GUARANTEED QoS) | SERVICE CATEGORY=VBR<br>PCR=12000 cps<br>SCR=6250 cps<br>MBS=37500 CELLS<br>CTD=ARBITRARY<br>CDV=4μs OF LESS |

FIG. 13

NETWORK INTERCONNECTION APPARATUS FOR INTERCONNECTING A LAN AND AN ATM NETWORK USING QOS ADJUSTMENT

BACKGROUND OF THE INVENTION (1) Field of the Invention

The present invention relates to network interconnection apparatus and method, and more particularly, to an apparatus and method for interconnecting a LAN (Local Area Network) and an ATM (Asynchronous Transfer Mode) network to perform communications.

(2) Description of the Related Art

ATM is a connection type communication mode developed so as to permit, within a single network, communications of multimedia information including data, voice, moving images, etc. to be performed at respective required rates while ensuring respective required qualities.

With conventional LANs which are preconditioned on broadcast function and connectionless type communication mode, it is difficult to ensure communication band or quality with respect to the requirements of such real-time communications of voice, moving images, etc. Attempts have therefore been made to construct LAN-ATM in which ATM is applied to LAN, and there is a need for economical and seamless connection between the two.

To permit interconnection of LAN and ATM, ATM Forum LAN Emulation (hereinafter abbreviated as LANE) Ver. 1.0, for example, is prescribed. LANE is a set of specifications that permit the connection and communications between an existing LAN environment and an ATM network environment, and emulation is carried out using the MAC (Media Access Control) layer of the LAN. Specifically, nodes are interconnected permanently by SVC (Switched Virtual Connection) at best-effort UBR (Unspecified Bit Rate) of the ATM network, to exchange data frames between the LAN and the ATM. Interconnection of LAN and ATM is also prescribed in LANE Ver. 2.0 and MPOA (Multi Protocol Over ATM) Ver. 1.0.

Meanwhile, with the advent of a multimedia network era, increasing attention has recently come to be directed to the QoS (Quality of Service) which networks provide. What is demanded from networks is, for example, up to at what degree of resolution and at what rate of transmission video can be sent to a destination.

Conventional techniques for guaranteeing QoS include a technique disclosed in Japanese Patent Application Laid-open Publication No. 9-331360, for example, in which call connection is tried first according to set QoS parameters, and if the call connection fails, the call connection request is repeatedly tried with the QoS request level gradually lowered until the call connection succeeds, to thereby guarantee QoS.

Concerning the guarantee of QoS, which is an advantage of ATM, LANE Versions 1.0 and 2.0 and MPOA Ver. 1.0 mentioned above have a problem in that they are not designed to guarantee QoS.

In LANE Ver. 1.0, for example, although ATM network is used to transfer LAN data through UBR connection, QoS is not guaranteed.

In the conventional technique disclosed in Japanese Patent Application Laid-open Publication No. 9-331360, on the other hand, QoS corresponding to physical port, destination address, application identifier, etc. is set beforehand, and accordingly, a problem arises in that the QoS guaranteed does not necessarily reflect actual traffic.

In addition, since the call connection request is repeated with the QoS level lowered until call is established, without regard to the status of network resources, there is a possibility of a large number of lost calls being generated, giving rise to a problem that useless traffic occurs in the network.

SUMMARY OF THE INVENTION

An object of the present invention is to provide a network interconnection apparatus which is capable of efficiently guaranteeing an optimum QoS suited to the status of actual traffic and network, thereby permitting high-performance network interconnection without entailing lost calls.

Another object of the present invention is to provide a network interconnection method which is capable of efficiently guaranteeing an optimum QoS suited to the status of actual traffic and network, thereby permitting high-performance network interconnection without entailing lost calls.

To achieve the first object, there is provided a network interconnection apparatus for interconnecting a LAN and an ATM network to perform communications. The network interconnection apparatus comprises routing information managing means for managing routing information of the ATM network, statistical information managing means for managing statistical information on traffic of the LAN, QoS setting means for setting QoS which the ATM network ought to guarantee, based on the statistical information, QoS guarantee determining means for determining based on the routing information whether or not the set QoS can be guaranteed, QoS adjusting means for adjusting the QoS so that the QoS can be guaranteed, if it is judged that the QoS cannot be guaranteed, and call connection control means for performing call connection according to the QoS which can be guaranteed.

There is also provided a network interconnection method for interconnecting a LAN and an ATM network to perform communications. The network interconnection method comprises managing routing information of the ATM network, managing statistical information on traffic of the LAN, setting QoS which the ATM network ought to guarantee, based on the statistical information, determining based on the routing information whether or not the set QoS can be guaranteed, adjusting the QoS so that the QoS can be guaranteed, if it is judged that the QoS cannot be guaranteed, and performing call connection according to the QoS which can be guaranteed.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a diagram illustrating statistical information;

FIG. 8 is a diagram showing results of QoS settings;

FIG. 10 is a diagram showing a designated transit list table for routing from node A to node E;

FIG. 11 is a diagram showing contents of settings of the information elements of a call connection request message;

FIG. 12 is a diagram also showing contents of settings of the information elements of a call connection request message;

FIG. 13 is a diagram illustrating QoS information;

DESCRIPTION OF THE PREFERRED EMBODIMENTS

Figure 1:
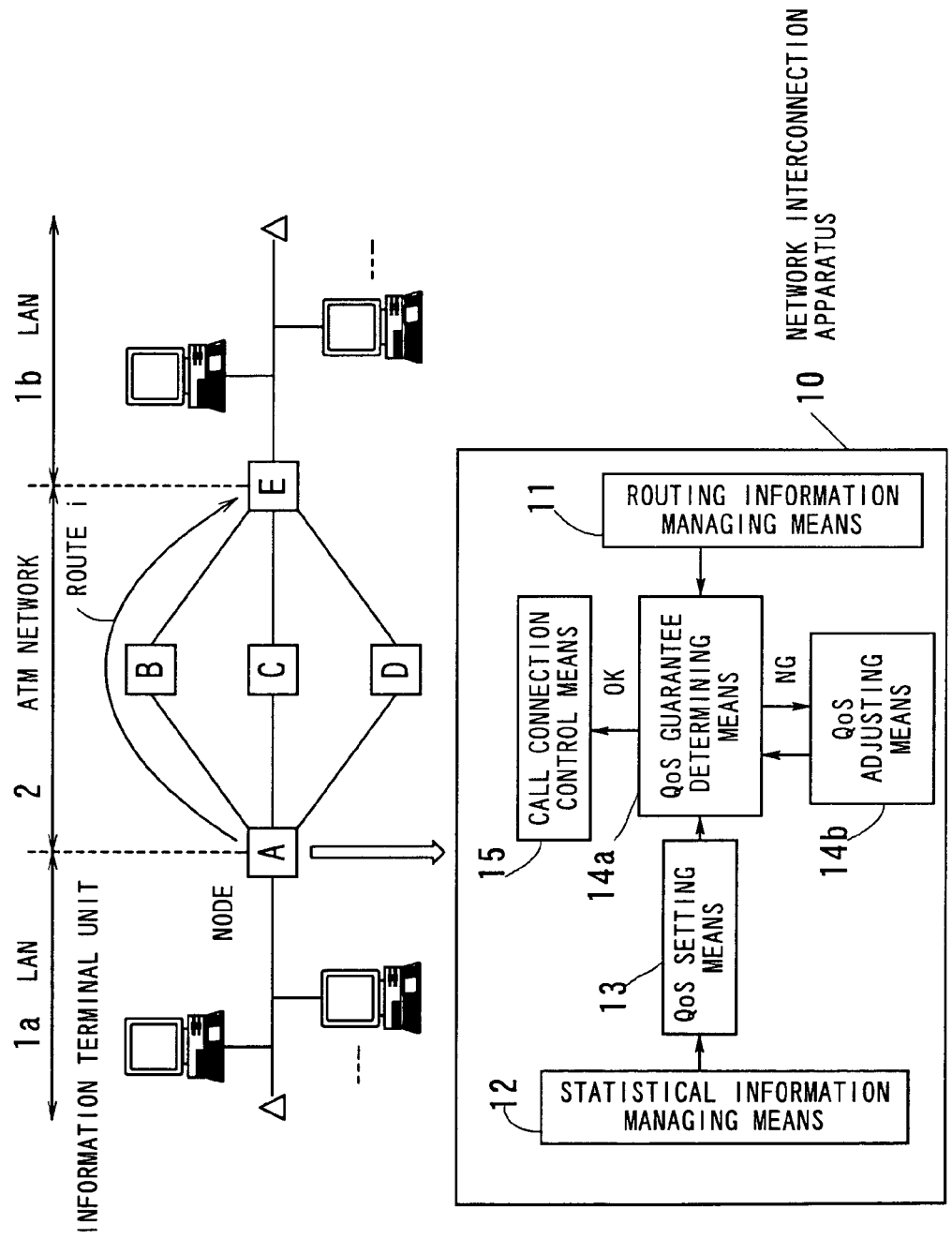
FIG. 1 is a diagram illustrating the principle of a network interconnection apparatus according to the present invention.

Embodiments of the present invention will be hereinafter described with reference to the drawings. FIG. 1 illustrates the principle of a network interconnection apparatus according to the present invention. A network interconnection apparatus 10 provides interconnection (hereinafter referred to as interworking) between a LAN and an ATM network for communications therebetween while guaranteeing optimum QoS.

In the illustrated network configuration, a LAN 1a and an ATM network 2 are interconnected by a node A, and the ATM network 2 and a LAN 1b are interconnected by a node E. Also, as shown in the figure, the LANs 1a and 1b each include a plurality of information terminal units connected to their circuit having bus-type topology, for example.

Where a call connection is to be established along the route of LAN 1a→ATM network 2→LAN 1b, the network interconnection apparatus 10 of the present invention is arranged at the node A.

Routing information managing means 11 collects and manages routing information of PNNI (Private Network-Network Interface) which reflects current resource status (hereinafter referred to as actual network) of the ATM network 2. PNNI has the function of both routing and signaling between ATM switches and is a protocol prescribing the interface between ATM switches.

The routing information includes, for example, ACR (available cell rate), CTD (cell transfer delay), CDV (cell delay variation), etc. between nodes.

Statistical information managing means 12 manages statistical information which reflects current traffic status (hereinafter referred to as actual traffic) of the LAN. The statistical information is numerical information which has been processed and modified to a high degree according to purposes, and includes, for example, a traffic volume which is the sum of frame sizes (frame lengths) or the total number of frames within a fixed time interval (per unit time), an average traffic volume thereof, etc.

QoS setting means 13 sets QoS which the ATM network 2 ought to guarantee, in accordance with the statistical information. As the QoS are specified types (parameters) including, for example, service category, band, delay, fluctuation, etc.

QoS guarantee determining means 14a determines based on the routing information whether or not the QoS set by the QoS setting means 13 can be guaranteed.

If it is judged that the QoS cannot be guaranteed, QoS adjusting means 14b adjusts the QoS so that the QoS can be guaranteed.

Call connection control means 15 establishes connection of an SVC (Switched Virtual Connection) call according to the QoS which the QoS guarantee determining means 14a has judged to be able to be guaranteed. In FIG. 1, call is connected via a route i of node A→node B→node E, thus establishing a path guaranteeing the QoS.

Specifically, QoS parameters as determined are specified in a call connection request message. Where a call is originated at the node A and terminated at the node E via the node B, a path guaranteeing QoS is set up at the time when the connection between the nodes is established.

As described above, the network interconnection apparatus 10 according to the present invention determines QoS which can be guaranteed, based on the routing information of the ATM network and the statistical information of the LAN to connect call.

This makes it possible to set optimum QoS suited to the status of actual traffic and actual network, and since call connection control is performed after the optimum QoS is determined, it may be performed only once, whereby interwork control can be carried out efficiently without entailing useless lost calls.

Figure 2:
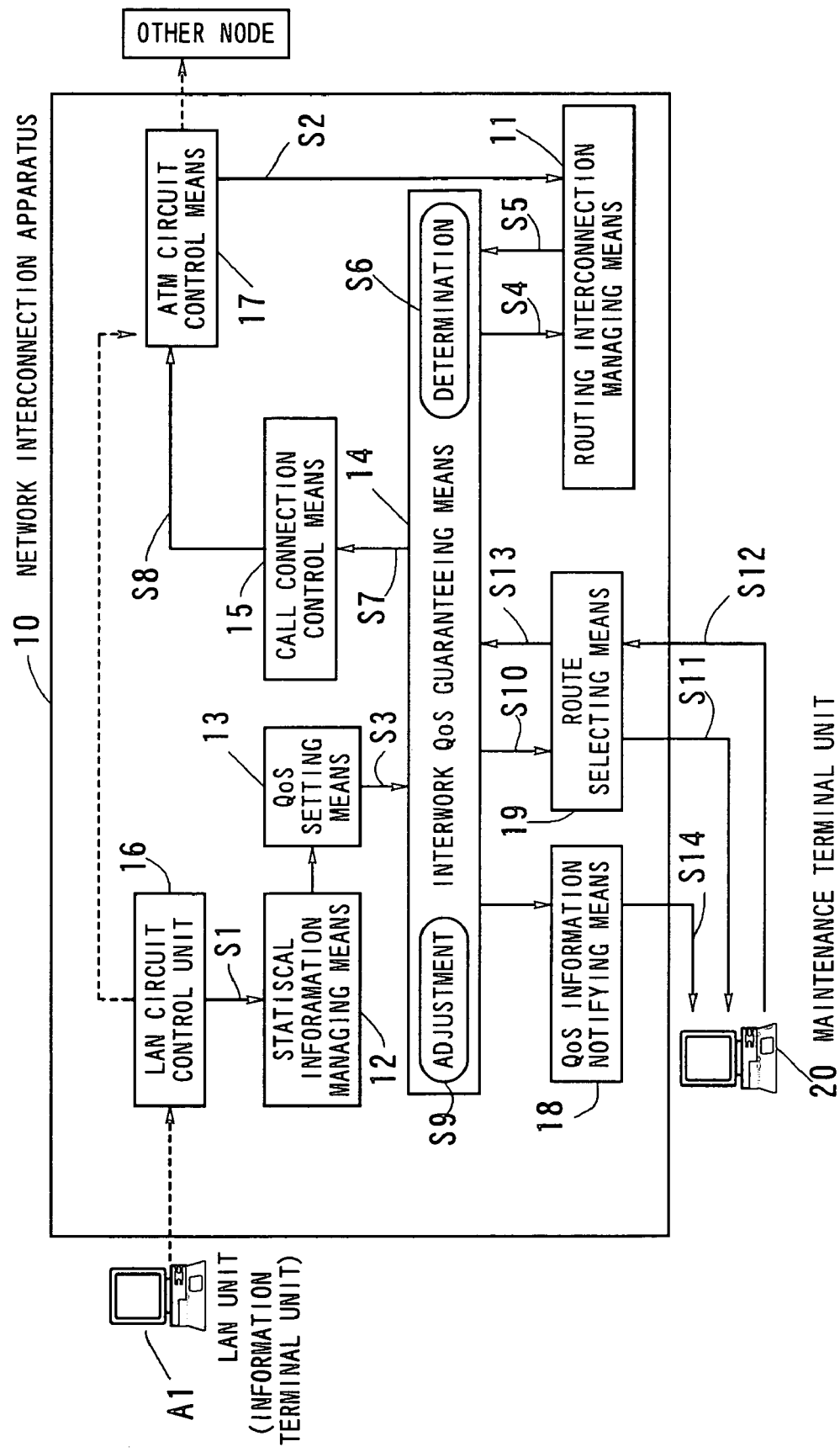
FIG. 2 is a diagram showing in detail the configuration of the network interconnection apparatus.

The configuration of the network interconnection apparatus 10 according to the present invention will be now described in detail. FIG. 2 shows details of the configuration of the network interconnection apparatus 10. In the following, description of those elements which are already explained with reference to FIG. 1 will be omitted.

LAN circuit control means 16 incorporates therein a LAN circuit interface. ATM circuit control means 17 incorporates therein an ATM network circuit interface.

Interwork QoS guaranteeing means 14 includes the QoS guarantee determining means 14a and the QoS adjusting means 14b.

QoS information notifying means 18 provides QoS information to an external maintenance terminal unit 20 connected to the network interconnection apparatus 10. The QoS information is information specifying, for example, parameters of the guaranteed QoS, or parameters of the QoS which cannot be guaranteed and the reason for the failure to guarantee the QoS, etc. The maintenance terminal unit 20 performs maintenance, management and monitoring of the network interconnection apparatus 10.

If there exist a plurality of route options with respect to the requested QoS when call is to be connected, route selecting means 19 selects a route according to preferential QoS, as described in detail later.

The operation of the apparatus will be now described. In FIG. 2, the arrow-headed dashed lines indicate the flow of information data, and the arrow-headed solid lines indicate the flow of control signals.

[S1] The statistical information managing means 12 generates statistical information based on actual traffic information received via the LAN circuit control means 16 and manages the generated information.

[S2] The routing information managing means 11 manages routing information which is actual network information received via the ATM circuit control means 17.

[S3] The QoS setting means 13 sets QoS in accordance with the statistical information, and requests the set QoS with respect to the interwork QoS guaranteeing means 14.

[S4] The interwork QoS guaranteeing means 14 requests the routing information managing means 11 to provide routing information.

[S5] The routing information managing means 11 sends in reply the routing information to the interwork QoS guaranteeing means 14.

[S6] Based on the routing information received from the routing information managing means 11, the interwork QoS guaranteeing means 14 determines whether or not the requested QoS can be guaranteed. If the requested QoS can be guaranteed, the flow proceeds to Step S7, and if not, the flow proceeds to Step S9. If it is judged that there are a plurality of routes guaranteeing the requested QoS, the flow proceeds to Step S10.

[S7] The interwork QoS guaranteeing means 14 sends a call connection instruction to the call connection control means 15.

[S8] The call connection control means 15 performs call connection control according to the QoS which has been judged to be able to be guaranteed, whereupon the flow proceeds to Step S14.

[S9] The interwork QoS guaranteeing means 14 lowers the QoS level for adjustment, and the flow returns to Step S4.

[S10] The interwork QoS guaranteeing means 14 sends route option information including the QoS and the route options to the route selecting means 19.

[S11] The route selecting means 19 transmits the route option information to the maintenance terminal unit 20.

[S12] The user specifies the QoS to which he or she desires to give priority, and transmits the specified QoS through the maintenance terminal unit 20 to the route selecting means 19.

[S13] The route selecting means 19 selects a route in accordance with the preferential QoS specified by the user, and sends information on the selected route to the interwork QoS guaranteeing means 14, whereupon the flow returns to Step S4.

[S14] The QoS information notifying means 18 notifies the maintenance terminal unit 20 of the QoS information received from the interwork QoS guaranteeing means 14.

Taking LANE as an example of LAN-ATM interworking, a first embodiment of the present invention will be now described in detail wherein the embodiment is applied to the decision of QoS at the time of establishment of Data Direct VCC (hereinafter referred to as ATM connection) in LANE.

The QoS for ATM connection is in actuality specified by specifying or combining information elements in a call connection request message (SETUP message), and accordingly, the method of setting the QoS will also be explained.

Figure 3:
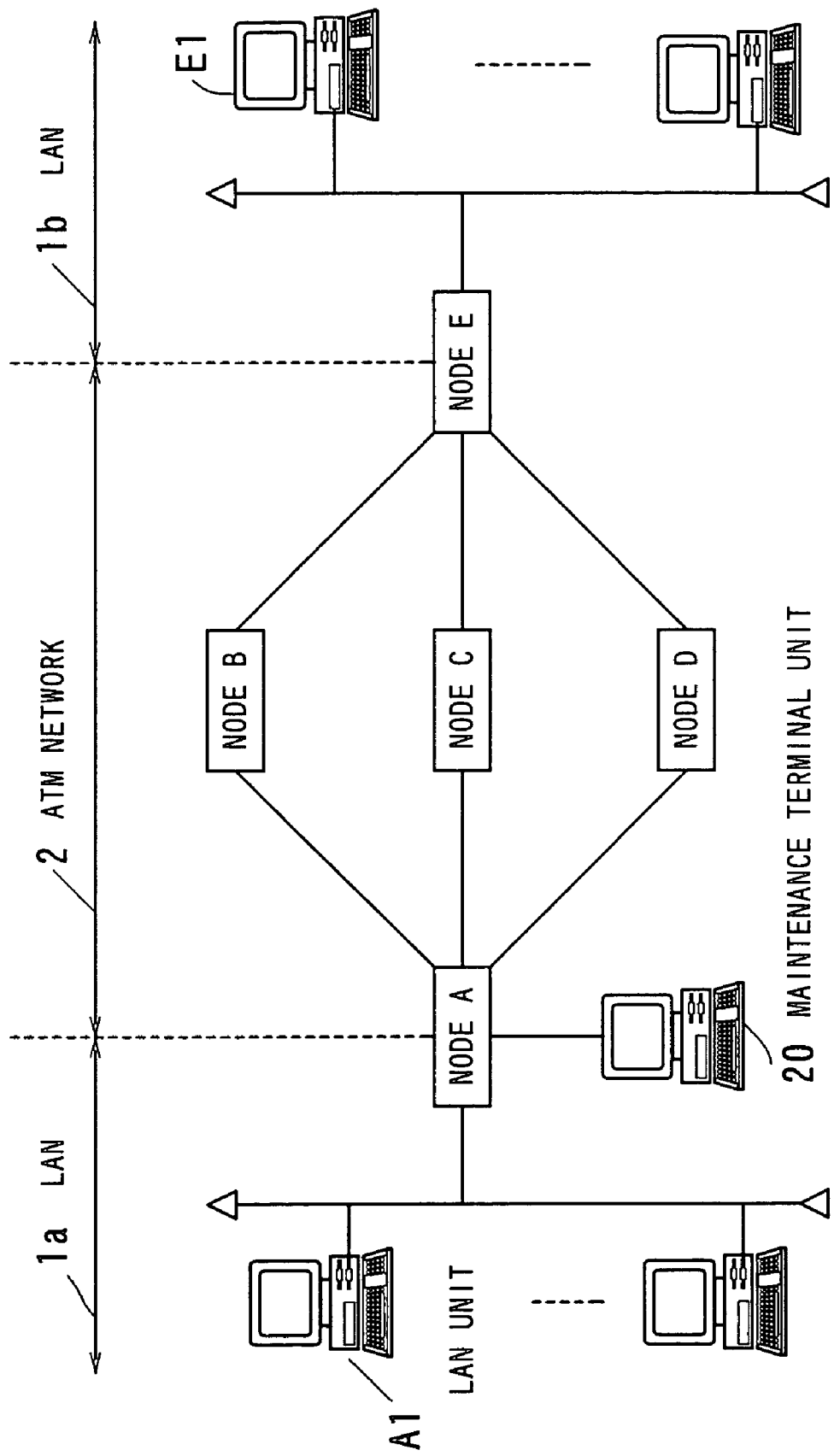
FIG. 3 is a diagram showing a network configuration to which the network interconnection apparatus is applied.

FIG. 3 shows a network configuration to which the network interconnection apparatus 10 is applied. A LAN 1*a* and an ATM network 2 are interconnected by a node A, and the ATM network 2 and a LAN 1*b* are interconnected by a node E.

The nodes A through E are each an ATM switched node, and the nodes A and E have a built-in function equivalent to LEC (LAN Emulation Client) in LANE for the LAN-ATM interworking.

LEC is a client function in LAN emulation whereby an existing LAN is virtually realized in ATM network.

The individual nodes are connected to one another by means of PNNI protocol and constitute the ATM network 2. The LANs 1*a* and 1*b* each include a plurality of LAN units (information terminal units) connected to their circuit having bus-type topology.

Where call connection (ATM connection) from the node A to the node E is to be established to permit communications between the LAN units A1 and E1, the network interconnection apparatus 10 of the present invention is arranged at the node A. The maintenance terminal unit 20 is connected to the network interconnection apparatus 10.

Figure 4:
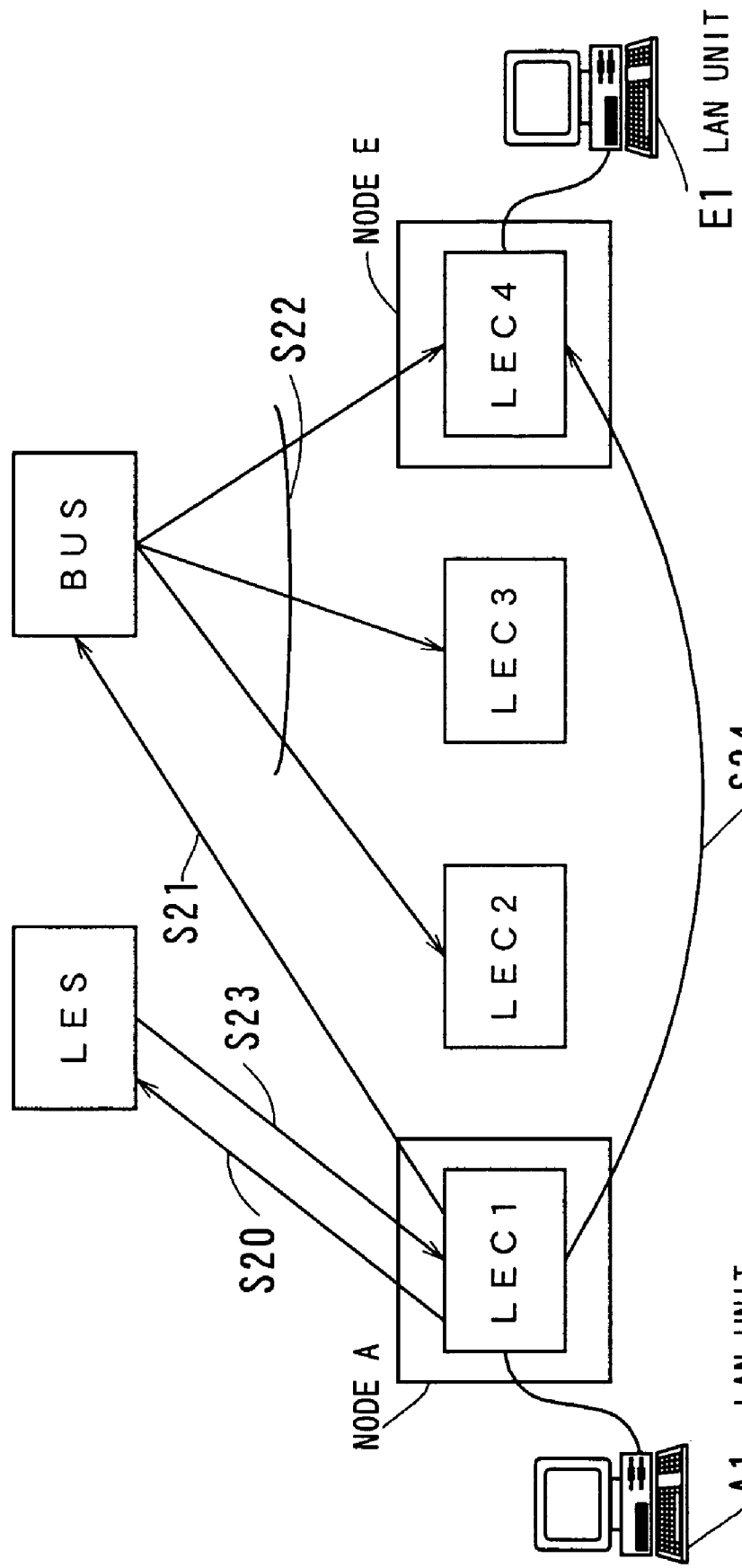
FIG. 4 is a diagram illustrating LANE.

FIG. 4 is a diagram illustrating LANE. A LEC 1, to which the LAN unit A1 is connected, is included in the node A shown in FIG. 3, and a LEC 4, to which the LAN unit E1 is connected, is included in the node E also shown in FIG. 3. A LES (LAN Emulation Server) and a BUS (Broadcast and Unknown Server) are included in the ATM network 2.

LES is an address resolution server function in LAN emulation whereby an existing LAN is virtually realized in ATM network.

BUS is a function of achieving LAN broadcasting in LAN emulation whereby an existing LAN is virtually realized in ATM network.

It is here assumed that TCP/IP data frames (hereinafter simply referred to as frames) are transferred from the LAN unit A1 to the LAN unit E1. In this case, it is necessary that the LEC 1 be informed of the ATM address of the LEC 4 when ATM connection is to be established between the LECs 1 and 4.

[S20] The LEC 1 queries the LES about the ATM address of the LEC 4.

[S21] While waiting for a response from the LES, the LEC 1 transfers frames to the BUS.

[S22] The BUS broadcasts the frames received from the LEC 1 to the LECs 2 to 4. Since the frames are thus broadcast via the BUS, they can be transmitted to the LEC 4 even though there is no direct ATM connection established between the LECs 1 and 4. The other LECs than the LEC 4, that is, the LECs 2 and 3, discard the received frames.

[S23] The LEC 1 receives the ATM address of the LEC 4 from the LES.

[S24] The LEC 1 transmits a call connection request message to the LEC 4 and establishes ATM connection. Then, the LEC 1 switches the frame transmission from the transmission via the BUS to the transmission through the ATM connection, to transfer frames directly to the LEC 4.

Let us now consider, as the first embodiment, the case where frames are transmitted from the LAN unit A1 connected to the LAN 1*a*, with which the node A interworks, to the LAN unit E1 connected to the LAN 1*b*, with which the node E interworks.

Frames to be transmitted from the LAN unit A1 to the LAN unit E1 are first sent from the LAN circuit control means 16 to the ATM circuit control means 17, both shown in FIG. 2. To establish ATM connection with respect to the node E accommodating the LAN unit E1 which is the destination of the frames, the node A queries the LES about the ATM address of the node E, following the procedure prescribed by LANE explained above with reference to FIG. 4.

Transfer of the frames via the BUS is continued until the ATM address of the terminating node E is resolved. Specifically, the ATM circuit control means 17 of the node A sets up TCP/IP connection to the node E via the BUS, and transfers the frames over the TCP/IP connection until the ATM address is resolved.

While the transfer is under way, the statistical information managing means 12 measures, through the LAN circuit control means 16, frame sizes or the number of frames transmitted per unit time over the TCP/IP connection, as information indicative of a traffic characteristic, and manages the acquired information as the statistical information.

FIG. 5 illustrates the statistical information. The statistical information managing means 12 generates statistical information as actual traffic information, based on the information obtained via the LAN circuit control means 16, and manages the generated information in the form of a statistical information management table 11*a*.

In the illustrated statistical information management table 11a are described traffic volumes per unit time sampled (in the illustrated example, sampled five times) with respect to each TCP/IP connection, and an average traffic volume thereof.

For example, in the case of the TCP/IP connection identifier #1, the traffic volumes sampled five times are all "19.2 kbps", and accordingly, "19.2 kbps" is described as the average traffic volume.

When the ATM address of the terminating node E has been resolved, it is necessary that the node A transmit a call connection request message to the node E to establish ATM connection with respect thereto.

Figure 6:
FIG. 6 is a diagram showing information elements of a call connection request message.

FIG. 6 shows information elements of such a call connection request message. The call connection control means 15 transmits a call connection request message to the node E via the ATM circuit control means 17. When a response message is thereafter received from the node E, ATM connection is established between the nodes A and E.

The call connection request message includes ATM Traffic Descriptor, Broadband Bearer Capability, DTL, Called Party Number, etc., as general information elements 15a specifying QoS.

The ATM Traffic Descriptor specifies, as its contents, PCR (Peak Cell Rate), SCR (Sustainable Cell Rate), MBS (Maximum Burst Size), etc.

The Broadband Bearer Capability specifies as its contents service category, mentioned later, etc., and the DTL specifies as its contents a list of routing (list of transit nodes) up to the terminating node, etc. The Called Party Number specifies as its contents the ATM address of the terminating node, etc.

According to the present invention, the above information elements are determined in accordance with the actual traffic and the actual network, in order to set up ATM connection which can guarantee optimum QoS.

Figure 7:
FIG. 7 is a diagram showing QoS parameters.

FIG. 7 shows QoS parameters. QoS parameters 13-1, which are set by the QoS setting means 13 and are requested with respect to the interwork QoS guaranteeing means 14, include service category, band, delay, and fluctuation.

As the service category is specified CBR (Constant Bit Rate) or VBR (Variable Bit Rate).

As the band, PCR (Peak Cell Rate), SCR (Sustainable Cell Rate), and MBS (Maximum Burst Size) are specified. CTD (Cell Transfer Delay) is specified as the delay, and CDV (Cell Delay Variation) as the fluctuation.

Where CBR is set as the service category, PCR alone is specified as requested band specification information in the information element for the ATM Traffic Descriptor in the call connection request message. In the case where VBR is set as the service category, it is necessary that PCR, SCR and MBS be specified as the requested band specification information.

In determining the service category, CBR is selected if [average traffic volume×1.2>maximum traffic volume] and VBR is selected if [average traffic volume×1.2≦maximum traffic volume].

This determination is in accord with a method wherein CBR is judged to be the applicable service category if the maximum traffic volume among the sampled traffic volumes is not greater than the average traffic volume plus 20%, and VBR is judged to be the applicable service category if the maximum traffic volume is greater than the average traffic volume plus 20%. MBS can be obtained by converting the traffic volume at the time of burst into the number of ATM cells.

In general, CBR is considered to be sensitive to delay while VBR is considered to be sensitive to fluctuation; therefore, when determining CTD and CDV, a small CTD value (small delay), for example, 20 μs or less, is required to be set if the service category is CBR.

If the service category is VBR, a small CDV value (small fluctuation), for example, 4 μs or less, is required to be set.

Accordingly, in the case where the statistical information is the one shown in FIG. 5 as the TCP/IP connection identifier #1 (where frames are being transmitted using the TCP/IP connection with the identifier #1), the QoS setting means 13 may set QoS as follows: service category=CBR, requested band specification information PCR=50 cps (=19.2 kbps), CTD=20 μs or less, and CDV=arbitrary.

Where the statistical information is the one also shown in FIG. 5 as the TCP/IP connection identifier #2, QoS can be set as follows: service category=CBR, requested band specification information PCR=12500 cps (=4.8 Mbps), CTD=20 μs, and CDV=arbitrary.

Further, where the statistical information is the one shown in FIG. 5 as the TCP/IP connection identifier #3, QoS can be set as follows: service category=VBR, requested band specification information PCR=15000 cps (=5.76 Mbps), SCR=6250 cps (=2.4 Mbps), MBS=30000 cells (=15000+ 15000 cells at the time of burst; i.e., the sum of the value obtained by converting the third sampled volume "5.76 Mbps" into the number of ATM cells and the value obtained by converting the fourth sampled volume "5.76 Mbps" into the number of ATM cells), CTD=arbitrary, and CDV=4 μs or less.

FIG. 8 collectively shows the results of the above QoS settings. In the figure are shown the results of the QoS settings (hereinafter referred to as QoS parameter setting information) corresponding to the TCP/IP connection identifiers #1 to #3, respectively.

In the following description of the first embodiment, it is assumed that QoS parameter setting information 13a associated with the TCP/IP connection identifier #1 has been set by the QoS setting means 13.

The QoS setting means 13 notifies the interwork QoS guaranteeing means 14 of the QoS parameter setting information 13a and the ATM address of the terminating node E. On receiving the QoS parameter setting information 13a and the ATM address of the terminating node E from the QoS setting means 13, the interwork QoS guaranteeing means 14 requests the routing information managing means 11 to provide routing information on routing up to the terminating node E.

Figure 9:
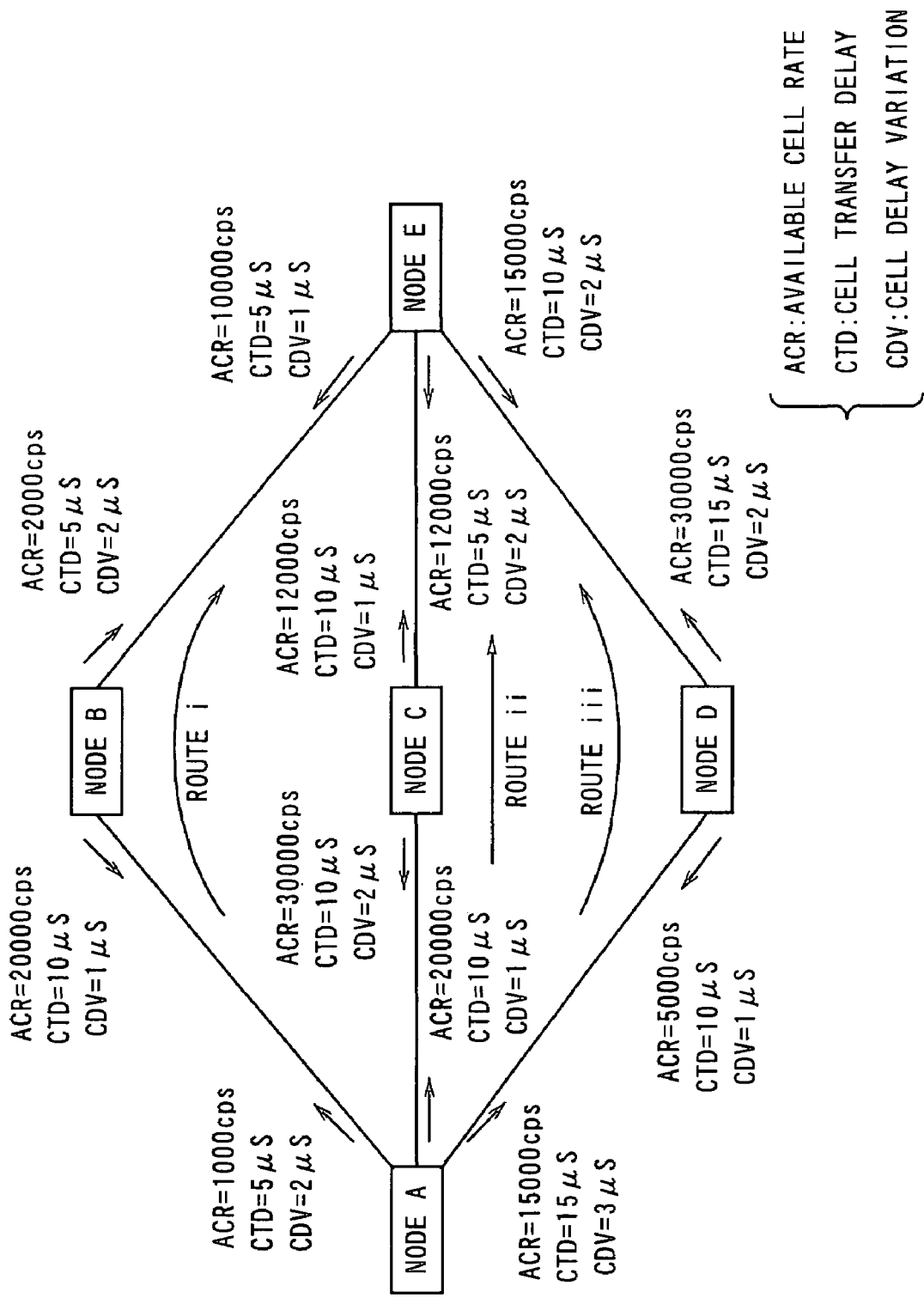
FIG. 9 is a diagram illustrating inter-node routing information.

FIG. 9 illustrates inter-node routing information. A route of node A→node B→node E constitutes a route i, a route of node A→node C→node E constitutes a route ii, and a route of node A→node D→node E constitutes a route iii. As routing information of PNNI between respective nodes, the values of ACR, CTD and CDV are set as shown in the figure.

FIG. 10 shows a designated transit list table for routing from the node A to the node E. On receiving the inter-node routing information as shown in FIG. 9 via the ATM circuit control means 17, the routing information managing means 11 updates topology data base (TDB) under management, and when requested to provide routing information on routing from the originating node to the terminating node, it creates a designated transit list (DTL) table 12a.

In the DTL table 12a, node A→node B→node E is specified as the routing list for the route i. In ACR 12a-1 is described the available cell rate. In the case of the route i, ACR in the direction of node A→node B is 1000 cps (cells per second) and ACR in the direction of node B→node E is 2000 cps; therefore, for the route of node A→node B→node E, a minimum value of 1000 cps is selected as the available cell rate.

In CTD 12a-2 is described an allowable cell transfer delay. In the case of the route i, CTD in the direction of node A→node B is 5 μs and CTD in the direction of node B→node E is 5 μs; therefore, for the route of node A→node B→node E, the sum of these values, that is, 10 μs, is set as CTD.

In CDV 12a-3 is described an allowable cell delay variation. In the case of the route i, CDV in the direction of node A→node B is 2 μs and CDV in the direction of node B→node E is 2 μs; therefore, for the route of node A→node B→node E, the sum of these values, that is, 4 μs, is set as CDV. The individual items of the routes ii and iii are determined in like manner.

In response to a request for the routing information, the routing information managing means 11 sends the DTL table 12a (or the inter-node routing information shown in FIG. 9) to the interwork QoS guaranteeing means 14. The interwork QoS guaranteeing means 14 determines whether or not the routing information sent from the routing information managing means 11 and the QoS parameter setting information 13a requested by the QoS setting means 13 satisfy respective QoS guaranteeing conditions mentioned below.

The QoS guaranteeing conditions are set as follows: For the band, QoS is guaranteed if [ACR of the route≧requested PCR], for the delay, QoS is guaranteed if [CTD of the route≦requested CTD], and for the fluctuation, QoS is guaranteed if [CDV of the route≦requested CDV].

With regard to the QoS parameter setting information 13a, ACR of the route (=1000 cps)≧requested PCR (=50 cps), CTD of the route (=10 μs)≦requested CTD (=20 μs), and the requested CDV=arbitrary. Accordingly, the route i can be recognized as a route meeting the requirements of the QoS parameter setting information 13a.

The route ii also satisfies the requirements of the QoS parameter setting information 13a, but the following description will be directed only to the route i, because the selection of one route from among a plurality of route options will be described later.

On judging that the route i fulfills the requirements of the QoS parameter setting information 13a, the interwork QoS guaranteeing means 14 notifies the call connection control means 15 of the QoS parameter setting information 13a, the routing list for the route i, and the ATM address of the terminating node E. The call connection control means 15 sets the items of information thus notified from the interwork QoS guaranteeing means 14 as the respective information elements of ATM Traffic Descriptor, Broadband Bearer Capability, DTL and Called Party Number, and makes a call connection request to the node E.

FIG. 11 shows the contents of settings of information elements of the call connection request message. Information elements 15b include ATM Traffic Descriptor, in which "50 cps" is specified as PCR, Broadband Bearer Capability, in which CBR is specified as the service category, DTL, in which A→B→E is specified as the routing list, and Called Party Number, in which the ATM address of the node E is specified as the terminating ATM address.

The call connection control means 15 thereafter receives a message responsive to the call connection request message from the node E, whereupon ATM connection (Data Direct VCC) is established along the route of node A→node B→node E.

For such ATM connection, optimum QoS suited to actual traffic of the LAN is selected. Consequently, after the switching of transmission from the frame transmission via the BUS to the transmission through ATM connection, frames can be transmitted from the LAN unit A1 to the LAN unit E1 over the ATM connection guaranteeing the optimum QoS.

Also, since QoS is determined beforehand in accordance with actual traffic and actual network and then the call connection control is performed, call can be connected efficiently without entailing useless lost calls.

A second embodiment will be now described. In the second embodiment, after a judgment is made that the QoS set first cannot be guaranteed, the interwork QoS guaranteeing means 14 adjusts the QoS so that the QoS can be guaranteed.

It is here assumed that the statistical information is the one shown in FIG. 5 as the TCP/IP connection identifier #3 and, accordingly, that the QoS setting means 13 has set the QoS parameter setting information 13c shown in FIG. 8.

The QoS setting means 13 notifies the interwork QoS guaranteeing means 14 of the QoS parameter setting information 13c having the contents shown in FIG. 8, that is, service category=VBR, PCR=15000 cps, SCR=6250 cps, MBS=30000 cells, CTD=arbitrary, and CDV=4 μs or less, as well as the ATM address of the terminating node E.

On receiving the QoS parameter setting information 13c from the QoS setting means 13, the interwork QoS guaranteeing means 14 requests the routing information managing means 11 to provide routing information on routing up to the terminating node E.

The interwork QoS guaranteeing means 14 thereafter receives the routing information shown in FIG. 10 and judges that there is no route satisfying the requirements of the QoS parameter setting information 13c. Namely, the actual network currently available does not meet the requirements of the QoS parameter setting information 13c.

In this case, however, the service category set in the QoS parameter setting information 13c is VBR. In view of the characteristics of VBR, the requested QoS can be almost perfectly guaranteed even if PCR cannot be guaranteed, by increasing MBS instead.

Accordingly, with respect to the route ii which meets the requirement for CDV, the interwork QoS guaranteeing means 14 decreases the requested PCR from "15000 cps" to "12000 cps" so that the requirements of the QoS parameter setting information 13c may be fulfilled.

MBS is instead increased to 30000×15000/12000=37500 cells. In this manner, QoS suited to actual traffic of the LAN is adjusted according to the status of resources of the actual network.

After adjusting the QoS parameter setting information 13c, the interwork QoS guaranteeing means 14 again requests the routing information managing means 11 to provide routing information, and receives the routing information therefrom. If, during this period of time, there has been no change in the routing information, then the adjusted QoS parameter setting information 13c (PCR=12000 cps; SCR=6250 cps; MBS=37500 cells; CTD=arbitrary; CDV=4 μs or less) naturally satisfies the conditions of the route ii (ACR=12000 cps; CTD=20 μs; CDV=2 μs), so that the QoS can be guaranteed by means of the route ii.

The interwork QoS guaranteeing means 14 notifies the call connection control means 15 of the adjusted QoS parameter setting information 13c, the routing list for the route ii, and the ATM address of the terminating node E.

The call connection control means 15 sets the items of information thus notified from the interwork QoS guaranteeing means 14 as the respective information elements of ATM Traffic Descriptor, Broadband Bearer Capability, DTL and Called Party Number, and makes a call connection request to the node E.

FIG. 12 shows the contents of settings of information elements of the call connection request message. Information elements 15c include ATM Traffic Descriptor, in which "50 cps" is specified as PCR, Broadband Bearer Capability, in which VBR is specified as the service category, DTL, in which A→C→E is specified as the routing list, and Called Party Number, in which the ATM address of the node E is specified as the terminating ATM address.

The call connection control means 15 thereafter receives a message responsive to the call connection request message from the node E, whereupon ATM connection (Data Direct VCC) is established along the route of node A→node C→node E.

The QoS information notifying means 18 will be now described. After ATM connection is established, the QoS information notifying means 18 notifies the user of the QoS information via the maintenance terminal unit 20. For example, in the case where the QoS requested first cannot be guaranteed and the adjusted QoS can instead be guaranteed, as in the second embodiment, the QoS information notifying means 18 transmits such items of information to the maintenance terminal unit 20.

FIG. 13 illustrates the QoS information. The illustrated information is QoS information 18a derived in the case of the second embodiment.

Specifically, the QoS which was requested first but could not be guaranteed is described as follows: service category=VBR, PCR=15000 cps, SCR=6250 cps, MBS=30000 cells, CTD=arbitrary, and CDV=4 µs or less.

The reason for the failure to guarantee the QoS is described as follows: band deficiency (between the nodes A and B and between the nodes B and E) of the route i, band deficiency (between the nodes C and E) of the route ii, and CDV of the route iii.

The QoS adjusted according to the actual network is described as follows: service category=VBR, PCR=12000 cps, SCR=6250 cps, MBS=37500 cells, CTD=arbitrary, and CDV=4 µs or less.

In this manner, the QoS information notifying means 18 notifies the user of the QoS information via the maintenance terminal unit 20, whereby the user can be readily informed of the current network status.

Figure 14:
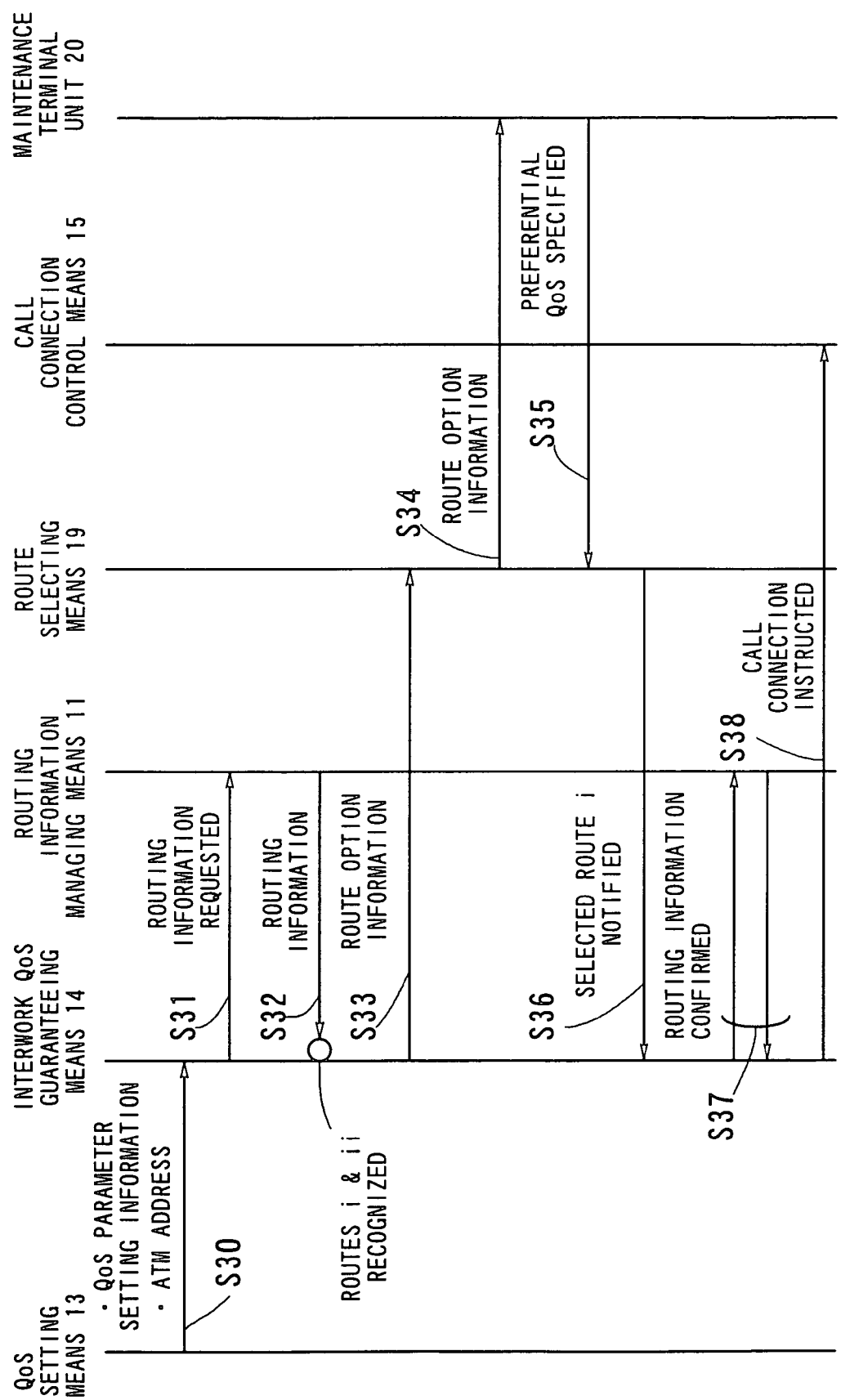
FIG. 14 is a sequence diagram illustrating a route selection procedure.

The route selecting means 19 will be now described. FIG. 14 is a sequence diagram illustrating a route selection procedure. It is here assumed that the statistical information is the one shown in FIG. 5 as the TCP/IP connection identifier #1 and, accordingly, that the QoS setting means 13 has set the QoS parameter setting information 13a shown in FIG. 8.

[S30] The QoS setting means 13 notifies the interwork QoS guaranteeing means 14 of the QoS parameter setting information 13a having the contents shown in FIG. 8, that is, service category=CBR, PCR=50 cps, CTD=20 µs, and CDV=arbitrary, as well as the ATM address of the terminating node E.

[S31] On receiving the QoS parameter setting information 13a from the QoS setting means 13, the interwork QoS guaranteeing means 14 requests the routing information managing means 11 to provide routing information on routing up to the terminating node E.

[S32] The interwork QoS guaranteeing means 14 receives the routing information shown in FIG. 10 from the routing information managing means 11, and recognizes that the routes i and ii fulfill the requirements of the QoS parameter setting information 13a.

[S33] The interwork QoS guaranteeing means 14 supplies the route selecting means 19 with route option information including the QoS parameter setting information 13a and the routing information about the routes i and ii.

[S34] The route selecting means 19 transmits the route option information to the maintenance terminal unit 20.

[S35] The user specifies, for example, delay as a preferential QoS, and transmits the specified QoS to the route selecting means 19 through the maintenance terminal unit 20.

[S36] Since delay has been specified as the preferential QoS, the route selecting means 19 selects the route i having a smaller CTD value, and notifies the interwork QoS guaranteeing means 14 that the route i has been selected.

[S37] The interwork QoS guaranteeing means 14 again requests the routing information managing means 11 to provide routing information, in order to confirm whether or not there has been a change in the routing information.

[S38] If there has been no change in the routing information, the interwork QoS guaranteeing means 14 instructs the call connection control means 15 to connect call via the route i.

Thus, in cases where there are a plurality of routes satisfying the requested QoS, the route selecting means 19 of the present invention selects a route in accordance with the QoS to which the user desires to give priority.

This makes it possible to efficiently select a route that meets the user's expectations. Alternatively, QoS to be given priority may be set beforehand in the route selecting means 19 on the assumption that there exist a plurality of routes meeting the requested QoS.

Figure 15:
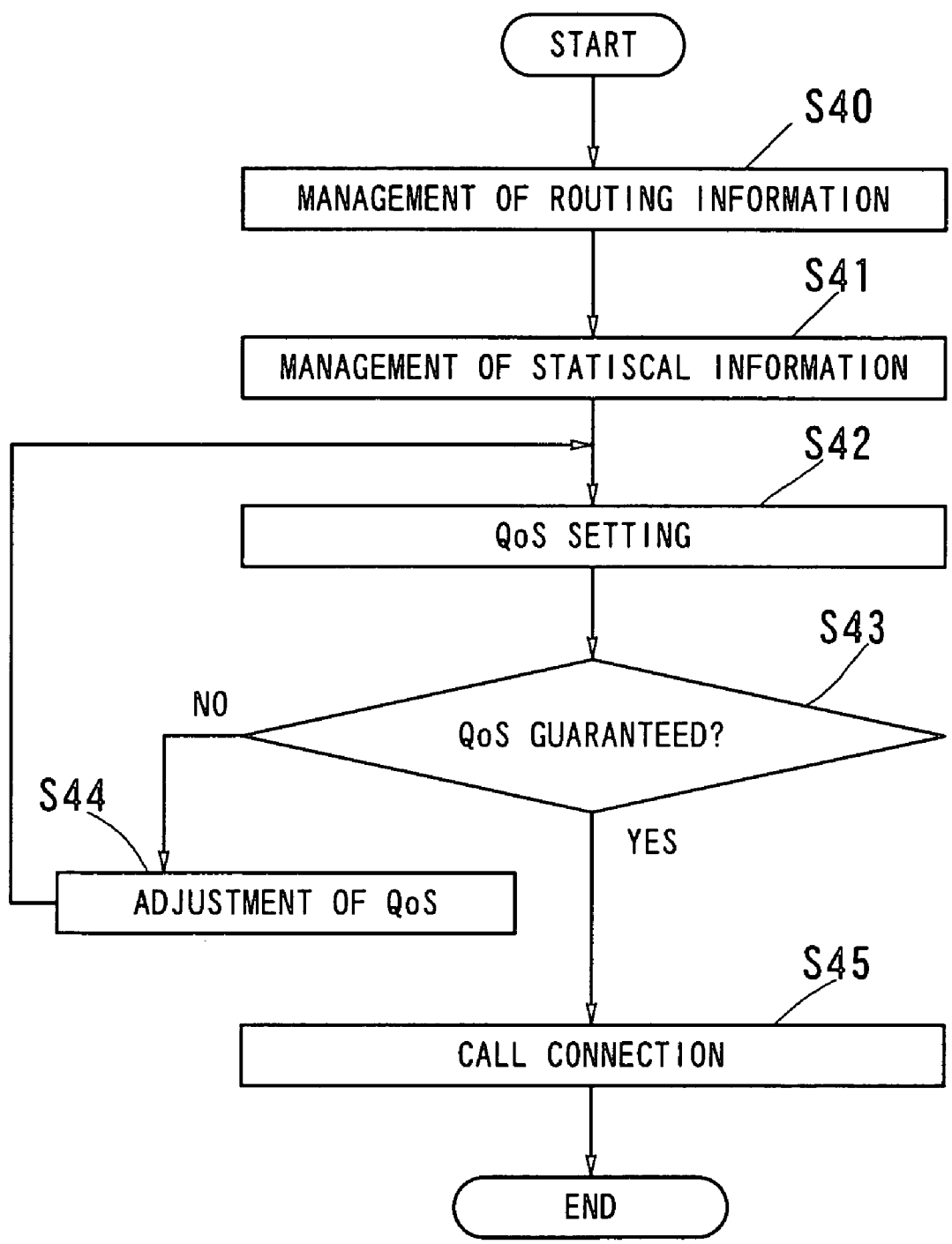
FIG. 15 is a chart illustrating a procedure of a network interconnection method.

A network interconnection method according to the present invention will be now described. FIG. 15 illustrates a procedure of the network interconnection method.

[S40] The routing information of the ATM network is managed.

[S41] The statistical information on the traffic of the LAN is managed.

[S42] QoS which the ATM network ought to guarantee is set based on the statistical information.

[S43] It is determined based on the routing information whether or not the set QoS can be guaranteed. If the set QoS cannot be guaranteed, the flow proceeds to Step S44, and if the set QoS can be guaranteed, the flow proceeds to Step S45.

[S44] The QoS is adjusted so that it can be guaranteed, and the flow returns to Step S42.

[S45] Call is connected according to the QoS which can be guaranteed.

As described above, according to the network interconnection apparatus 10 and method of the present invention, appropriate QoS to be guaranteed through ATM connection is set with respect to a LAN-ATM interworking communication node, based on the actual traffic of the LAN, whereby ATM connection reflecting the status of resources of the actual network can be established at a low rate of occurrence of lost calls.

Even in the case where there is no route satisfying the set QoS, the requested QoS is adjusted within a range allowable with respect to the actual traffic of the LAN, so that optimum QoS then available in the actual network can be guaranteed.

Further, the user can be notified of the QoS which can be guaranteed or of the QoS which cannot be guaranteed as well as the reason for the failure to guarantee such QoS, and is also allowed to select a route as desired by specifying a preferential QoS parameter.

In the foregoing description, the QoS guarantee determining means 14a is incorporated in the interwork QoS guaranteeing means 14, but it may alternatively be incorporated in the routing information managing means 11.

In this case, the interwork QoS guaranteeing means 14 receives from the routing information managing means 11 only the routing information which has been judged to fulfill the requested QoS.

As described above, the network interconnection apparatus according to the present invention is constructed such that QoS which can be guaranteed is determined based on the routing information of the ATM network and the statistical information of the LAN, to connect call. Accordingly, optimum QoS suited to the status of actual traffic and actual network can be set, permitting efficient interwork control.

In the network interconnection method applied to the apparatus of the present invention, QoS which can be guaranteed is determined based on the routing information of the ATM network and the statistical information of the LAN, to connect call. Consequently, optimum QoS suited to the status of actual traffic and actual network can be set, making it possible to perform efficient interwork control.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A network interconnection apparatus for interconnecting a LAN and an ATM network to perform communications, comprising:

routing information managing means for managing routing information of the ATM network;

wherein the routing information includes at least one of ACR (available cell rate), CTD (cell transfer delay) and CDV (cell delay variation);

statistical information managing means for managing statistical information of a connection between a LAN terminal and another LAN terminal, the statistical information includes information on traffic of two or more connections which may be established between a LAN terminal and another LAN terminal;

wherein said statistical information managing means manages, as the statistical information, a traffic volume which is a sum of frame sizes or a total number of frames within a fixed time interval and which reflects traffic status of the LAN, and an average traffic volume thereof;

QoS setting means for setting QoS for the ATM network which the ATM network ought to guarantee, based on measured statistics managed by the statistical information managing means, the QoS including information elements of a call connection request message;

wherein parameters of the QoS includes a service category which is at least one of CBR (Constant Bit Rate) or VBR (Variable Bit Rate), band, delay which is CTD, and fluctuation which is CDV;

QoS guarantee determining means for determining whether or not the QoS which the ATM network ought to guarantee, as determined by the QoS setting means, can be guaranteed;

wherein CBR is judged to be the service category if average traffic volume times $\alpha(1<\alpha<2)$ is greater than maximum traffic volume, and VBR is judged to be the service category if average traffic volume times $\alpha(1<\alpha<2)$ is less than or equal to maximum traffic volume, where $\alpha$ is a set value to determine whether the service category is CBR or VBR;

and wherein if the service category is CBR then the value of CTD is decided to be smaller than the value when the service category is not CBR and if the service category is VBR then the value of CDV is decided to be smaller than when the service category is not VBR;

QoS adjusting means for adjusting the QoS so that the QoS can be guaranteed, if it is judged that the QoS cannot be guaranteed; and call connection control means for performing call connection according to the QoS which can be guaranteed.

2. The network interconnection apparatus according to claim 1, wherein said QoS adjusting means adjusts a maximum burst size of QoS whose service category is variable transmission rate and whose maximum cell rate has been judged to be incapable of being guaranteed so that the QoS can be guaranteed.

3. The network interconnection apparatus according to claim 1, further comprising QoS information means for making notification of QoS information.

4. The network interconnection apparatus according to claim 1, further comprising route selecting means for selecting a route according to preferential QoS if there exist a plurality of route options when the call connection is to be performed.

5. The network interconnection apparatus according to claim 1, which is connected to a maintenance terminal unit for performing maintenance and management.

6. The network interconnection apparatus according to claim 1, wherein the band is at least one of PCR (Peak Cell Rate), SCR (Sustainable Cell Rate) and MBS (Maximum Burst Size), and the QoS guarantee determining means selects PCR if the service category is CBR and selects PCR, SCR and MBS if the service category is VBR.

* * * * *